United States Patent Office 3,408,215
Patented Oct. 29, 1968

3,408,215
CURING AGENTS FOR EPOXY RESINS
Marco Wismer, Gibsonia, and John R. Peffer, Verona, Pa., assignors to Pittsburgh Plate Glass Company, Pittsburgh, Pa., a corporation of Pennsylvania
No Drawing. Filed June 26, 1964, Ser. No. 378,414
16 Claims. (Cl. 106—252)

ABSTRACT OF THE DISCLOSURE

Novel storage-stable curing agents for epoxide resins are obtained by esterifying an admixture of polyol, nonhalogenated polycarboxylic acid, and halogenated polycarboxylic acid in the presence of an aliphatic diol having 2 to 10 carbon atoms and solubilizing the ester in a solvent. These curing agents give improved flexibility and harder cures to the epoxide resin coating systems.

---

This application relates to a novel method of preparing storage-stable curing agents for epoxide resins. It has particular relation to a method of preparing storage-stable esters of a polycarboxylic acid and a polyol, said ester having at least two free carboxyl groups per molecule, for curing epoxidized oil coating systems.

Epoxy resin coating systems are currently used in numerous applications where chemical resistance is desired. Such coatings are also known for their hardness and durability in numerous applications. A coating system disclosed in U.S. Patent 3,050,480 utilizes epoxidized drying oils derived from vegetable, animal, and marine sources which have been epoxidized with peracetic acid or other means. This type of epoxy resin coating system can be applied in thin films to form hard, mar-resistant, corrosion-resistant coatings.

One type of epoxy resin system utilized comprises an epoxidized long chain fatty acid or ester thereof having an iodine value of at least 90 before epoxidation and after epoxidation containing not less than 4 percent oxirane groups located within the molecules of said fatty acid chain material.

Curing of these epoxidized oils has been accomplished by using polycarboxylic acids of various types, such as monochlorophthalic acid, tetrachlorophthalic acid, and hexachloroendomethylenetetrahydrophthalic acid (chlorendic acid).

While the coating systems disclosed in U.S. Patent 3,050,480 are useful, a further modification has been introduced wherein esters of polycarboxylic acids and polyols, said esters having a minimum of two free carboxyl groups per molecule, have been substituted for the acid curing agents of the above patent. The carboxyl terminated esters, when used as curing agents for epoxidized vegetable oils, give improved flexibility and harder cures to the coating systems.

These carboxyl terminated esters are generally non-polymeric in nature, i.e., each of the OH groups of a polyol is reacted with a carboxyl group of a polycarboxylic acid, the other carboxyl groups of that acid molecule remaining unreacted. The structural representation of these carboxyl terminated esters is as follows:

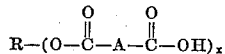

wherein R is an organic group containing only carbon, hydrogen, nitrogen, and oxygen, preferably an open chained organic group having 2 to 15 carbon atoms, such as an alkyl group of 2 to 15 carbon atoms, alkoxyalkyl groups having 4 to 15 carbon atoms, and the like, representing the backbone of a polyol, A is an organic hydrocarbon group, preferably a mono-nuclear cyclic group having 6 cyclic carbon atoms, and $x$ is a whole number from 2 to 6 although preferably from 2 to 4, which represents the number of carboxyl groups per ester as well as the hydroxyl functionality of the polyol.

A further advantage of the carboxyl terminated esters resides in the fact that acids such as phthalic, isophthalic, terephthalic, and the like can be utilized in preparing these esters although such acids are not suitable when utilized as the sole curing agent for epoxidized vegetable oils. Phthalic, terephthalic, and isophthalic acids are not strong enough per se to promote rapid cure of epoxidized vegetable oils; therefore, in the carboxyl terminated esters described above, it is preferred to utilize a chlorinated acid as a portion of the polycarboxylic acid reactant.

Although the carboxyl terminated esters are advantageously utilized as curing agents for epoxidized oils, such esters are frequently unstable during storage. Esters prepared from a polyol and a mixture of non-halogenated polycarboxylic acids and halogenated polycarboxylic acids, such as mixtures of phthalic acid and hexachloroendomethylenetetrahydrophthalic acid, frequently form precipitates form precipitates after standing in solution for a period of days. This precipitate is undesirable in a curing agent solution.

It has now been discovered that a storage stable solution comprising a carboxyl terminated ester prepared from a polyol, a nonhalogenated polycarboxylic acid containing 2 to about 12 carbon atoms, preferably a mononuclear cyclic polycarboxylic acid having 6 cyclic carbon atoms, and a halogenated polycarboxylic acid containing about 3 to about 12 carbon atoms, preferably a cyclic polycarboxylic acid having at least 6 cyclic carbon atoms, said nonhalogenated polycarboxylic acid being present in a ratio of moles of acid to equivalents of polyol of about 0.05:1 to about 0.75:1, said halogenated polycarboxylic acid being present in such quantity as to have a ratio of total moles of acid to equivalents of polyol of about 0.6:1 to about 1.2:1, wherein any non-halogenated polycarboxylic acid which is initially unreacted with the polyol or later becomes displaced from said polyol, is at least partly esterified with an aliphatic diol having 2 to 10 carbon atoms.

The carboxyl terminated ester always contains at least 0.05:1 moles of halogenated polycarboxylic acid to equivalents of polyol, and at the lower levels of total acid to polyol, for example, 0.6:1, the halogenated polycarboxylic acid is present at about 0.3:1 moles of halogenated polycarboxylic acid to equivalents of polyol. The amount of halogenated acid required is inversely proportional to the total quantity of acid present per equivalent of polyol. Of course, higher levels of halogenated polycarboxylic acid may be utilized at the higher ratios of total acid to polyol if desired; for example, an ester composed of 1.2 moles of acid to 1 equivalent of polyol may contain upwards of 90 mole percent of the total acid present as halogenated polycarboxylic acid.

This ester composition when dissolved in an appropriate solvent such as those hereinafter disclosed, is storage stable, i.e., does not form an undesirable precipitate and has improved pot life when admixed with an epoxidized oil to form a coating composition without adversely affecting the curing time of films prepared therefrom.

A novel method for preparing the storage stable solution of the carboxyl terminated ester described above involves the following steps:

(1) heating an admixture of a polyol, preferably one having a functionality greater than two, a nonhalogenated polycarboxylic acid having 2 to 12 carbon atoms, and a halogenated polycarboxylic acid having 3 to 12 carbon atoms to a temperature of about 100° C. to about 250° C., preferably about 140° C. to about 200° C., to effect esterification, said non-halogenated polycarboxylic acid preferably being an aromatic polycarboxylic acid such as phthalic acid and being present in a ratio of about 0.05:1 to about 0.75:1, based upon the ratio moles of acid to the equivalents of polyol present, said halogenated polycarboxylic acid being present in such quantity as to give a ratio of total moles of acid (halogenated and nonhalogenated) to equivalents of polyol in the range of about 0.6:1 to about 1.2:1 and, (2) after esterification has been completed, maintaining the temperature of the admixture at about 140° C. to about 180° C., preferably at about 150° C. to about 165° C., while adding about 1.0 percent by weight to about 8.0 percent by weight of a diol based upon the weight of ester present. The resulting admixture can be cooled and dissolved in an appropriate solvent such as a mixture of higher boiling aliphatic hydrocarbons and the monomethyl ether of ethylene glycol acetate.

The above technique, substantially a fusion process, is preferably practiced by admixing the nonhalogenated polycarboxylic acid and the polyol initially and heating to a temperature of about 100° C. to about 250° C. prior to the addition of the halogen containing polycarboxylic acid.

As mentioned above, the ester is preferably prepared by having the halogenated polycarboxylic acid present as about 20 mole percent to about 90 mole percent of the total acid present.

The process may also be carried out in a manner similar to that outlined above, but in the presence of a suitable solvent. Suitable solvents include:

toluene
petroleum naphtha
higher boiling aromatic solvents, i.e., those boiling above about 130° C., e.g., xylene
higher boiling aliphatic solvents, i.e., those boiling above about 130° C.

and the like.

While it is preferred to add the diol at the conclusion of the esterification reaction, the novel process can also be practiced by adding the diol during or before the initial esterification step. This procedure has the advantage of eliminating the separate step described hereinabove for diol addition. The carboxyl terminated esters prepared by this alternate method are comparable to those prepared by the method described hereinabove.

The carboxyl terminated ester is dissolved in a suitable solvent for use as a curing agent for epoxidized drying oils. Such solvents include:

toluene
higher boiling aromatic solvents, i.e., those boiling above about 130° C. such as xylene, naphthalene, and the like,
ketones such as methyl ethyl ketone, methyl isobutyl ketone, and the like,
esters such as butyl acetate, amyl acetate, octyl acetate, and the like,
ethers such as ethylene glycol monobutyl ether, ethylene glycol monobutyl ether acetate, ethylene glycol monoethyl ether acetate, ethylene glycol monomethyl ether acetate, and the like.

Polycarboxylic acids useful in the instant invention preferably contain 2 to 12 carbon atoms and include:

phthalic acid
isophthalic acid
terephthalic acid
tetrahydrophthalic acid
hexahydrophthalic acid
endomethylenetetrahydrophthalic acid
hexachloroendomethylenetetrahydrophthalic acid
tetrachlorophthalic acid
monochlorophthalic acid
dichloromaleic acid
monochloromaleic acid and the like, wherein the term acid is used to include corresponding anhydrides where such anhydrides exist.

The nonhalogenated polycarboxylic acids contemplated as being primarily amenable to the instant invention are those having a solubility of less than 2.0 grams per 100 grams of ethyl ether. Of the above nonhalogenated polycarboxylic acids, phthalic acid and its anhydride are generally preferred for utilization in these esters. It is significant that the precipitation problem is most acute with phthalic acid and its anhydride; therefore, the novel techniques of this invention have their greatest applicability to carboxyl terminated esters containing phthalic acid.

When tetrahydrophthalic and hexahydrophthalic acids are used as the nonhalogenated acids in the preparation of the carboxyl terminated esters of this invention, no precipitation from solution occurs; however, the treatment with diols improves the pot-life of epoxidized oil resins which have been catalyzed with carboxyl terminated esters of such acids.

The polyols which are utilized as the backbone of the carboxyl terminated esters of this invention contain from about 2 to about 6 hydroxyl groups. Such polyols include:

ethylene glycol
propylene glycol
diethylene glycol
dipropylene glycol
trimethylolpropane
trimethylolethane
pentaerythritol
dipentaerythritol
tripentaerythritol
glycerol
1,2,6-hexanetriol
butylene glycol
triethylene glycol
neopentyl glycol
mannitol
sorbitol
diethanolamine
triethanolamine
triisopropylamine
N,N,N′N′-tetrakis(hydroxypropyl)ethylenediamine and the like.

Aliphatic polyols having a hydroxyl functionality of greater than 2 and from 3 to about 15 carbon atoms are preferred for the purposes of this invention.

The diols used to stabilize the carboxyl terminated esters include aliphatic diols of 2 to 10 carbon atoms such as:

ethylene glycol
propylene glycol
neopentyl glycol
1,3 propanediol
1,4 butane diol
diethylene glycol
dipropylene glycol and the like. The preferred diols are ethylene glycol and neopentyl glycol.

In curing epoxidized drying oils of the type described hereinabove, it is preferred to include a conventional epoxide resin such as:

bis(4-glycidoxyphenyl)-2,2-propane
bis(4-glycidoxyphenyl)-1,1-ethane
bis(4-glycidoxyphenyl)-2,2-butane
4,4′-diglycidoxy biphenyl
1,2-diglycidoxyethane
1,3-diglycidoxypropane
1-chloro-2,3-epoxy propane
2-chloro-3,4-epoxy butane
3,4-epoxy-6-methylcyclohexylmethyl-3,4-epoxy-6-methylcyclohexane carboxylate bis(3,4-epoxy-6-methylcyclohexylmethyl)adipate
limonene dioxide and the like.

The following preparation illustrates the conventional method of preparing a carboxyl terminated ester which is suitable for curing epoxidized oils of the type mentioned hereinabove.

PREPARATION A.—An ester curing agent was prepared from the following ingredients:

| | |
|---|---|
| Phthalic anhydride | 133 grams (0.9 mole). |
| Pentaerythritol | 68 grams (0.5 mole). |
| Hexachloroendomethylenetetrahydrophthalic acid (chlorendic acid) | 389 grams (1.0 mole). |
| Solvent [1] | 50 milliliters. |

[1] Solvent is Solvesso 100, an aromatic hydrocarbon mixture having a boiling point range of 150° C. to 170° C.

Phthalic anhydride, pentaerythritol, and Solvesso 100 were admixed in a reaction vessel equipped with a stirrer, reflux condenser, temperature measuring device, inert gas sparge tube, and moisture trap. These ingredients were heated to about 150° C. At this temperature about one-third of the chlorendic acid was added. The heating and stirring was continued for about 10 additional minutes before an additional one-third of the chlorendic acid was added. The mixture was then heated for approximately 20 minutes more before the final addition of chlorendic acid was made.

The mixture was heated further to a temperature of about 175° C. This temperature was maintained until all the water of reaction had been collected in the moisture trap. The temperature was then lowered to about 160° C. at which temperature about 104 milliliters of the monoethyl ether of ethylene glycol acetate and 330 milliliters of Solvesso 100 were added.

The product had a final acid value of about 109, a color (Gardner) of 4, a viscosity (Gardner-Holdt) of U to V, a solids content of 60.7 percent, and a free anhydride content of 3.96 percent.

After standing for 1 week, the solution was cloudy; After about 10 days the solution was very cloudy, indicating precipitation.

The following examples illustrate in detail the novel features of this invention. The examples are not intended to limit the invention, however, for there are, of course, numerous possible variations and modifications.

EXAMPLE I

A stable ester curing agent was prepared from the following ingredients:

| | |
|---|---|
| Phthalic anhydride | 133 grams (0.9 mole). |
| Pentaerythritol | 68 grams (0.5 mole). |
| Hexachloroendomethylenetetrahydrophthalic acid (chlorendic acid) | 389 grams (1.0 mole). |
| Solvent [1] | 50 milliliters. |

[1] Solvent is Solvesso 100, an aromatic hydrocarbon mixture having a boiling point range of 150° C. to 170° C.

The phthalic anhydride, pentaerythritol, and solvent were admixed in a reaction vessel equipped similarly to that used in Preparation A. The admixture was heated to about 150° C. at which temperature about one-third of the chlorendic acid was added. The chlorendic acid was added incrementally over a period af about 20 minutes while maintaining the temperature at about 150° C. to about 160° C. The temperature of the mixture was then raised to about 175° C., the water of esterification being collected. When all the water of esterification had been removed, the mixture was allowed to cool. At about a temperature of 160° C., about 23 grams of ethylene glycol were added. The temperature was maintained at about 160° C. for about one-half hour. The reaction mixture was then thinned in a solvent mixture of 104 milliliters of the monoethyl ether of ethylene glycol acetate and 330 milliliters of Solvesso 100.

The final product had an acid value of 94.2 without water, an acid value of 97.8 with water, a color of 2 (Gardner), a viscosity of V to W (Gardner-Holdt), a solids content of 60.8 percent, and a phthalic anhydride content of 0.95 percent as calculated from the difference in acid values determined with and without added water.

This mixture was stable upon storage. No precipitate was evident after one month's storage of several samples in a cold room, a hot room, and at room temperature.

EXAMPLE II

A stable ester curing agent was prepared using trimethylolpropane to stabilize the ester:

| | Grams |
|---|---|
| Phthalic anhydride | 665 |
| Pentaerythritol | 340 |
| Chlorendic acid | 1945 |

The phthalic anhydride, pentaerythritol, and about one-third of the chlorendic acid were admixed in a reaction vessel similarly equipped to that utilized in Preparation A. The admixture was heated to about 160° C. before the remaining two-thirds of the chlorendic acid were added. The mixture continued to be heated under an inert gas blanket with some of the inert gas being bubbled through the reaction mixture. The temperature was maintained at about 175° C. until all the water of reaction was removed. The reaction mixture was then cooled to about 160° C. at which temperature about 80 grams of trimethylolpropane were added. The temperature was maintained at about 160° C. for about 30 minutes before about 1020 milliliters of Solvesso 100 and 780 milliliters of the monoethyl ether of ethylene glycol acetate were added.

After filtering the reaction product, it had an acid value of 110, solids content of 67.5, viscosity of Y to Z (Gardner-Holdt), and a color about 4+ (Gardner).

After storage of several samples for 20 days in a cold room, hot room, and at room temperature, no precipitate was observed in any of the samples.

EXAMPLE III

A stable ester curing agent was prepared using neopentyl glycol as a stabilizing ingredient.

| | |
|---|---|
| Phthalic anhydride | 133 grams (0.9 mole). |
| Pentaerythritol | 68 grams (0.5 mole). |
| Chlorendic acid | 389 grams (1.0 mole). |
| Solvent [1] | 50 milliliters. |

[1] Solvent was Solvesso 100, an aromatic hydrocarbon mixture having a boiling point range of 150° C. to 170° C.

The phthalic anhydride, pentaerythritol, and solvent were charged to a reaction vessel equipped similarly to that utilized in Preparation A. The admixture was heated to a temperature of about 170° C. at which temperature about one-third of the chlorendic acid was added. The chlorendic acid was added incrementally over a period of about 20 minutes while the temperature was maintained at about 175° C. The reaction mixture continued to be heated until all the water of reaction was removed. The reaction mixture was cooled to a temperature of about 140° C. at which temperature about 25 grams of neopentyl glycol were added. The temperature was maintained at about 150° C. for about one-half hour.

At a temperature of about 140° C., an admixture of monoethyl ether of ethylene glycol acetate (104 milliliters) and Solvesso 100 (300 milliliters) was added.

After filtering, the reaction product had an acid value of 97.2, a viscosity of X to Y (Gardner-Holdt), a color of 3 (Gardner), and solids content of 62.6 percent.

EXAMPLE IV

To determine the effect upon pot-life of a catalyzed, epoxidized oil, the following tests were performed:

Several samples of an epoxidized oil resin containing 4.5 parts by weight of an epoxidized soya oil having an oxirane oxygen content of 5.8 percent (epoxide equivalent weight of 276) and 0.5 part by weight of EP-201 (3,4 - epoxy - 6 - methylcyclohexylmethyl -3,4 - epoxy-6-methylcyclohexane carboxylate) dissolved in a mixture of 5.0 parts by weight of Solvesso 100 (aromatic hydrocarbon mixture having a boiling point range of 150° C. to 170° C.) and 1.7 parts by weight of the monoethyl ether of ethylene glycol acetate, were catalyzed with various catalysts (carboxyl terminated esters).

| Sample | Curing Agent | Time for a film to achieve a track-free condition (hrs.) | Gel time (pot-life) hours |
|---|---|---|---|
| A | 8.3 parts by weight (5.0 parts by weight of solids) of a carboxyl terminated ester having a molar ratio of 1.0/0.5/0.5/0.5 of respectively: chlorendic acid, phthalic acid, pentaerythritol, tetrahydrophthalic acid, and solubilized in a mixture of solvents as illustrated in Preparation A hereinabove. | 1.75 | 94 |
| B | 8.3 parts by weight (5.0 parts by weight of solids) of a carboxyl terminated ester having a molar ratio of 1.0/0.5/0.5/0.5 of respectively: chlorendic acid, phthalic acid, pentaerythritol, tetrahydrophthalic acid, and solubilized in a mixture of solvents and treated with 4 percent by weight of ethylene gylcol as illustrated in Example I. | 1.5 | 192 |
| C | 8.3 parts by weight (5.0 parts by weight of solids) of a carboxyl terminated ester having a molar ratio of 1.0/0.9/0.5 of respectively: chlorendic acid, phthalic acid, pentaerythritol, and solubilized in a mixture of solvents and treated with 4 percent by weight of ethylene gycol as illustrated in Example I. | 1.25 | 140 |

EXAMPLE V

Additional tests performed in the manner of Example IV and illustrating the improved pot-life of epoxidized oils catalyzed with the novel esters of this invention are tabulated below:

|  | A | B | C | D | E | F | G | H |
|---|---|---|---|---|---|---|---|---|
| Moles chlorendic acid | 1.0 | 1.0 | 1.0 | 1.0 | 1.0 | 1.0 | 1.0 | 1.0 |
| Moles phthalic anhydride | 0.9 | 0.9 | 0.9 | 0.9 | 0.9 |  |  |  |
| Moles tetrahydrophthalic anhydride |  |  |  |  |  | 0.9 | 0.9 | 0.9 |
| Moles pentaery thritol | 0.5 | 0.5 | 0.5 | 0.5 | 0.5 | 0.5 | 0.5 | 0.5 |
| Percent by weight ethylene glycol |  | 3.9 | 3.9 |  |  |  | 3.9 |  |
| Percent by weight neopentyl glycol |  |  |  | 3.9 | 3.9 |  |  | 3.9 |
| Acid value | 112 | 92 | 96 | 99 | 95 | 98 | 98 | 99 |
| Drying time tackfree, Hours | 2.25 | 2.5 | 1.0 | 2.5 | 2.5 | 2.5 | 2.0 | 2.5 |
| Gel time, Hours | 45 | 184 | 164 | 115 | 78 | 94 | 184 | 120 |
| Time of glycol addition [1] |  | (2) | (3) | (2) | (3) |  | (2) | (3) |

[1] Time of glycol addition indicates whether the glycol was added initially with other reactants or was added finally, i.e., after substantial esterification had been effected.
[2] Initial.
[3] Final.

From the tests of the above samples, it is noteworthy that the curing agents (carboxyl terminated esters) treated with a diol gave catalyzed epoxidized oils having considerably better pot-life without any apparent decrease in cure time.

All of the above films were cured at room temperature and all of the films when fully cured were hard, mar-resistant, and solvent resistant.

While specific examples of the invention have been set forth hereinabove, it is not intended to limit the invention solely thereto, but to include all of the variations and modifications falling within the scope of the appended claims.

We claim:

1. A curing agent solution for epoxide resins comprising (1) an ester prepared from a polyol containing from about 2 to about 6 hydroxyl groups, a nonhalogenated polycarboxylic acid containing 2 to about 12 carbon atoms, and a halogenated polycarboxylic acid containing 3 to about 12 carbon atoms, said nonhalogenated polycarboxylic acid being present in a ratio of moles of acid to equivalents of polyol of about 0.05:1 to about 0.75:1, said halogenated polycarboxylic acid being present in such quantity as to have a ratio of total moles of acid to equivalents of polyol of about 0.6:1 to about 1.2:1, wherein any nonhalogenated polycarboxylic acid unreacted with said polyol is at least partly esterified with an aliphatic diol having 2 to 10 carbon atoms, and (2) a solvent for said ester.

2. A curing agent solution for epoxide resins comprising (1) an ester prepared from an aliphatic polyol having a hydroxyl functionality from about 2 to about 6 and containing 3 to about 15 carbon atoms, a nonchlorinated mononuclear cyclic polycarboxylic acid having 6 cyclic carbon atoms and a chlorinated cyclic polycarboxylic acid having at least 6 cyclic carbon atoms, said nonchlorinated polycarboxylic acid being present in a ratio of moles of acid to equivalents to polyol of about 0.05:1 to about 0.75:1, said chlorinated polycarboxylic acid being present in such quantity as to have a ratio of total moles of acid to equivalents of polyol of about 0.6:1 to about 1.2:1, wherein any nonchlorinated polycarboxylic acid unreacted with said polyol is at least partly esterified with an aliphatic diol selected from the group consisting of ethylene glycol and neopentyl glycol, and (2) a solvent for said ester.

3. The curing agent solution of claim 2 wherein the polyol is selected from the group consisting of pentaerythritol, dipentaerythritol, and tripentaerythritol, the non-chlorinated polycarboxylic acid is selected from the group consisting of phthalic acid, isophthalic acid, tetrahydrophthalic acid and hexahydrophthalic acid and the chlorinated polycarboxylic acid is selected from the group consisting of hexachloroendomethylenetetrahydrophthalic acid and tetrachlorophthalic acid.

4. A coating composition vehicle comprising
(a) an epoxidized fatty acid chain consisting of materials selected from the group consisting of epoxidized long chain fatty acids and esters thereof having an iodine value of at least 90 before epoxidation and after epoxidation containing not less than 4 percent oxirane groups located within the molecules of said fatty acid chain material,
(b) a curing agent having free carboxyl groups comprising an ester prepared from an aliphatic polyol having a hydroxyl functionality from about 2 to about 6 and containing 3 to about 15 carbon atoms, a nonchlorinated mononuclear cyclic polycarboxylic acid having 6 cyclic carbon atoms and a chlorinated cyclic polycarboxylic acid having at least 6 cyclic carbon atoms, said nonchlorinated polycarboxylic acid being present in a ratio of moles of acid to equivalents of polyol of about 0.05:1 to about 0.75:1, said chlorinated polycarboxylic acid being present in such quantity as to have a ratio of total moles of acid to equivalents of polyol of about 0.6:1 to about 1.2:1, wherein any nonchlorinated polycarboxylic acid unreacted with said polyol is at least partly esterified with an aliphatic diol selected from the group consisting of ethylene glycol and neopentyl glycol, and
(c) a mutual solvent for (a) and (b).

5. A method of preparing a curing agent solution of an ester of polyol containing from about 2 to about 6 hydroxyl groups, a nonhalogenated polycarboxylic acid containing 2 to about 12 carbon atoms, and a halogenated polycarboxylic acid containing 3 to about 12 carbon atoms comprising esterifying an admixture of polyol, nonhalogenated polycarboxylic acid, and halogenated polycarboxylic acid at a temperature of about 100° C. to about 250° C. in the presence of about 1.0 percent by weight to about 8.0 percent by weight of the reactants, an aliphatic diol having 2 to 10 carbon atoms and solubilizing in a solvent for the ester, said nonhalogenated polycarboxylic acid being present in a ratio of moles of acid to equivalents of polyol of about 0.05:1 to about 0.75:1, said halogenated polycarboxylic acid being present in such quantity as to have a ratio of total moles of acid to equivalents of polyol of about 0.6:1 to about 1.2:1.

6. A method of preparing a curing agent solution of an ester of a polyol, a nonhalogenated polycarboxylic acid containing 2 to about 12 carbon atoms, and a halogenated polycarboxylic acid containing 3 to about 12 carbon atoms comprising:
   (a) esterifying an admixture of polyol containing from about 2 to about 6 hydroxyl groups, nonhalogenated polycarboxylic acid, and halogenated polycarboxylic acid at a temperature of about 100° C. to about 250° C., said nonhalogenated polycarboxylic acid being present in a ratio of moles of acid to equivalents of polyol of about 0.05:1 to about 0.75:1, said halogenated polycarboxylic acid being present in such quantity as to have a ratio of total moles of acid to equivalents of polyol of about 0.6:1 to about 1.2:1,
   (b) adding about 1.0 percent by weight to about 8.0 percent by weight of the reactants of an aliphatic diol of 2 to 10 carbon atoms at a temperature of about 140° C. to about 180° C., and
   (c) solubilizing the ester in a solvent for the ester.

7. The method of claim 6 wherein the esterification of polyol, nonhalogenated polycarboxylic acid and halogenated polycarboxylic acid is conducted at a temperature of about 140° C. to about 250° C.

8. The method of claim 6 wherein the polyol is selected from the group consisting of pentaerythritol, dipentaerythritol, tripentaerythritol, the nonhalogenated polycarboxylic acid is selected from the group consisting of phthalic acid, isophthalic, tetrahydrophthalic acid, and hexahydrophthalic acid, and the halogenated polycarboxylic acid is selected from the group consisting of hexachloroendomethylenetetrahydrophthalic acid and tetrachlorophthalic acid.

9. The method of claim 8 wherein the diol is selected from the class consisting of ethylene glycol and neopentyl glycol.

10. The method of claim 6 wherein the esterification is conducted in the presence of a solvent.

11. A method of preparing a curing agent solution of an ester of a polyol, a nonhalogenated polycarboxylic acid containing 2 to about 12 carbon atoms, and a halogenated polycarboxylic acid containing 3 to about 12 carbon atoms comprising:
   (a) heating an admixture of polyol containing from about 2 to about 6 hydroxyl groups and nonhalogenated polycarboxylic acid to a temperature of about 100° C. to about 250° C., said nonhalogenated polycarboxylic acid being present in a ratio of moles of acid to equivalents of polyol of about 0.05:1 to about 0.75:1, said halogenated polycarboxylic acid being present in such quantity as to have a ratio of equivalents of polyol of about 0.6:1 to about 1.2:1, wherein any nonhalogenated polycarboxylic acid unreacted with said polyol is at least partly esterified with an aliphatic diol having 2 to 10 carbon atoms,
   (b) maintaining the temperature at about 100° C. to about 250° C. while adding said halogenated polycarboxylic acid, said halogenated polycarboxylic acid being added in such quantity as to have a ratio of total moles of acid to equivalents of polyol of about 0.6:1 to about 1.2:1, and
   (c) solubilizing the ester in a solvent for the ester.

12. The method of claim 11 wherein the mixture of polyol and nonhalogenated polycarboxylic acid is heated to a temperature of about 140° C. to about 200° C. and the temperature is maintained at about 140° C. to about 200° C. while the halogenated polycarboxylic acid is added.

13. The method of claim 11 wherein the polyol is pentaerythritol, the nonhalogenated polycarboxylic acid is phthalic acid, and the halogenated polycarboxylic acid is hexachloroendomethylenetetrahydrophthalic acid.

14. The method of claim 11 wherein the diol is selected from the class consisting of ethylene glycol and neopentyl glycol.

15. The method of claim 11 wherein the admixture is heated in the presence of a solvent.

16. The method of claim 6 wherein the nonhalogenated polycarboxylic acid and the polyol are admixed initially and heated to a temperature of about 100° C. to about 250° C. prior to the addition of the halogen-containing polycarboxylic acid.

References Cited
UNITED STATES PATENTS

| | | |
|---|---|---|
| 3,018,258 | 1/1962 | Meier et al. _____ 260—2 |
| 3,050,480 | 8/1962 | Budde _____ 106—252 |
| 3,269,853 | 8/1966 | English _____ 106—252 |

ALLAN LIEBERMAN, *Primary Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,408,215                                                      October 29, 1968

Marco Wismer et al.

It is certified that error appears in the above identified patent and that said Letters Patent are hereby corrected as shown below:

In the heading to the printed specification, line 4, "Pittsburgh Plate Glass Company," should read -- PPG Industries, Inc., --. Column 8, line 17, "to polyol" should read -- of polyol --.

Signed and sealed this 10th day of March 1970.

(SEAL)
Attest:

Edward M. Fletcher, Jr.                                WILLIAM E. SCHUYLER, JR.
Attesting Officer                                               Commissioner of Patents